(12) United States Patent
Lin

(10) Patent No.: US 7,471,282 B2
(45) Date of Patent: Dec. 30, 2008

(54) LIGHT BRIGHTNESS CONTROLLER FOR AN OPTICAL MOUSE

(75) Inventor: Chia-Chun Lin, Nantou (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 582 days.

(21) Appl. No.: 10/964,758

(22) Filed: Oct. 15, 2004

(65) Prior Publication Data

US 2005/0195169 A1 Sep. 8, 2005

(30) Foreign Application Priority Data

Mar. 5, 2004 (TW) .............................. 93105862 A

(51) Int. Cl.
*G06F 3/033* (2006.01)

(52) U.S. Cl. ...................................... 345/166; 345/163

(58) Field of Classification Search .......... 345/156–184
See application file for complete search history.

(56) References Cited

U.S. PATENT DOCUMENTS 6,172,354 B1 * 1/2001 Adan et al. .................. 345/156
7,209,502 B2 * 4/2007 Brosnan ..................... 345/166

* cited by examiner

*Primary Examiner*—David L Lewis
(74) *Attorney, Agent, or Firm*—Bacon & Thomas, PLLC

(57) ABSTRACT

A light brightness controller for an optical mouse, which has a light source, a current switch and a control unit. The light source illuminates a sampling plane of a mouse. The current switch has a plurality of switches respectively connected to the light source such that the control unit connected to the current switch can control an amplitude of current flowing through the light source by turning the switches on and off, thereby controlling a brightness of the light source.

9 Claims, 5 Drawing Sheets

LIGHT BRIGHTNESS CONTROLLER FOR AN OPTICAL MOUSE

BACKGROUND OF THE INVENTION

1. Field of the Invention

The invention relates to the technical field of an optical mouse and, more particularly, to a light brightness controller for an optical mouse.

2. Description of Related Art

Typically, an optical mouse uses a light emitted diode (LED) to illuminate a pad or other object and an image sensor to obtain image frames on the pad for comparing a previous and a current images and obtaining a motion vector of the optical mouse. FIG. 1 is a block diagram of the optical mouse, which includes a light source 210, a resistor 220 and an optical processor 230. The light source 210 is an LED to vary current flowing through the light source 210 by the resistor 220, thereby determining the brightness of the light source 210. There are two types where a frame signal indicates a start or synchronous signal of each image frame for controlling lighting of the LED, as shown in FIG. 2 illustrating a control timing diagram of lighting the LED. The first type is a normal mode, which the LED 210 lighting or not is determined by using the optical mouse or not, i.e., the LED 210 is lighted when the optical mouse is active and not lighted when the optical mouse is idle. Therefore, the lighting active/idle time covers the entire frame. The second type is a shutter mode, which the LED 210 lighting or not is determined by using a shutter or not (FIG. 2), i.e., the LED 210 is lighted only when the shutter is active. Further, the exposure amount received by the optical processor 230 is changed in accordance with on/off time of the shutter.

In the optical mouse, as the resistor 220 is soldered to a printed circuit board (PCB), the current flowing through the light source 210 is fixed without the flexibility to the brightness of the light source 210. If the optical processor 230 has high sensitivity to rays, the light source 210 is continuously lighting while the shutter is opened or even the optical mouse is active. Thus, it can be happened that the shutter cannot be shrunk but an image sensed by the optical processor 230 still presents in saturation, so that the optical mouse cannot have associated detection.

Further, the optical mouse facing surfaces with deeper colors needs longer shutter time to image, but the light source 210 has to keep on a certain high brightness due to processing speed requirement. In addition, the light source 210 requires longer lighting time at suspend (current standard limit for USB Suspend to 500 μA), so that the current standard limit cannot be met. Thus, the prior optical mouse cannot perform motion detection by a function of motion wakeup at suspend.

Further, the light source 210 lighted off can cause very high instant current consumption so as to cause noises. FIG. 3 illustrates current flowing through the light source 210. As shown in FIG. 3, due to imaging differences, when the light source 210 is turned on or off (respectively indicated by A and B in FIG. 3), appearance of the respective over-shooting and under-shooting can easily cause mistakes to the optical mouse, where a frame signal indicates a start or synchronous signal of each image frame.

Therefore, it is desirable to provide an improved light brightness controller for an optical mouse to mitigate and/or obviate the aforementioned problems.

SUMMARY OF THE INVENTION

An object of the invention is to provide a light brightness controller for an optical source, which can avoid over-shooting or under-shooting as turning the light source on or off in the prior art.

Another object of the invention is to provide a light brightness controller for an optical source, which can avoid images sensed by the optical processor in saturation when the shutter cannot be shrunk in the prior art.

A further object of the invention is to provide a light brightness controller for an optical source, which can add light control ability and flexibly reduce light brightness to obtain required images from longer shutter activation, such that the associated current standard at averaged power consumption is met to further perform the function of motion wakeup at suspend.

In accordance with one aspect of the present invention, there is provided a light brightness controller for an optical mouse. The controller includes a light source, a current switch and a control unit. The light source illuminates a sampling plane of an optical mouse. The current switch has a plurality of switches respectively connected to the light source for providing the light source with a current to flow therethrough as one of the switches is turned on. The control unit is connected to the current switch for controlling the current flowing through the light source by controlling the switches on and off.

In accordance with another aspect of the present invention, there is provided a light brightness controller for an optical mouse. The controller includes a light source, a current switch, a voltage-controlled device and a control unit. The light source illuminates a sampling plane of an optical mouse. The current switch has a switch connected to the light source such that a current flows through the light source when the switch is turned on. The voltage-controlled device has an output terminal connected to the current switch such that the current flowing through the light source is controlled by a voltage of the output terminal. The control unit is connected to the voltage-controlled device in order to set the voltage, thereby controlling the current flowing through the light source and a brightness of the light source.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
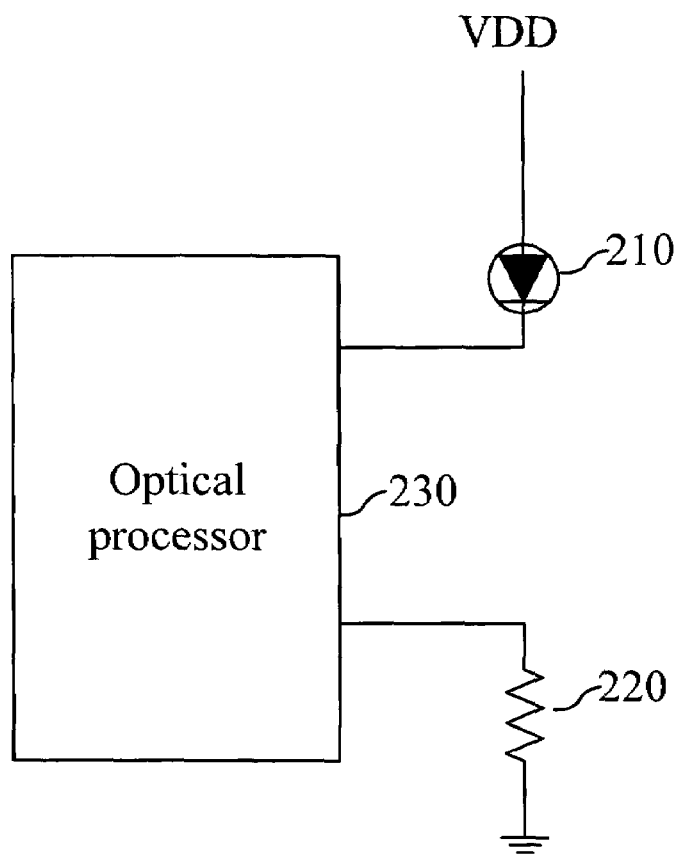
FIG. 1 is a block diagram of a conventional optical mouse.
Figure 2:
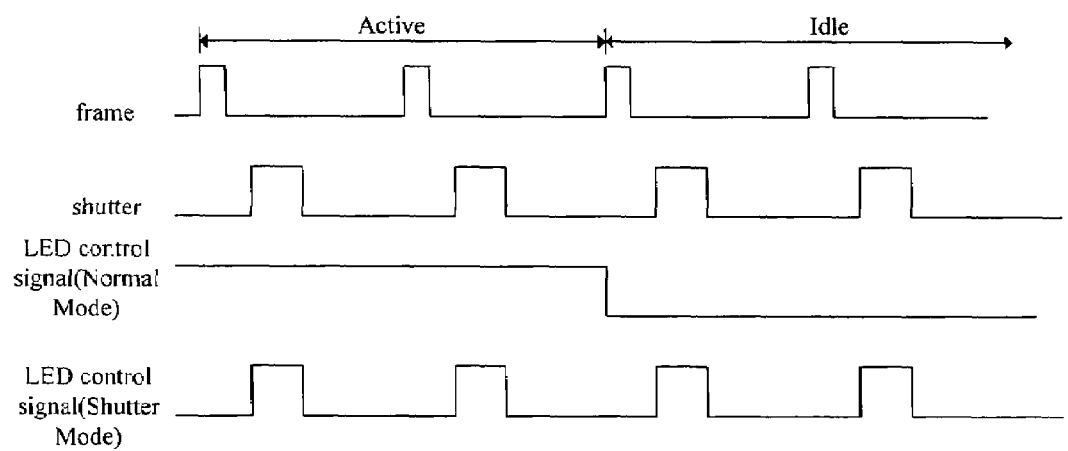
FIG. 2 is a control timing diagram of lighting an LED by a conventional optical mouse when a shutter mode is closed.
Figure 3:
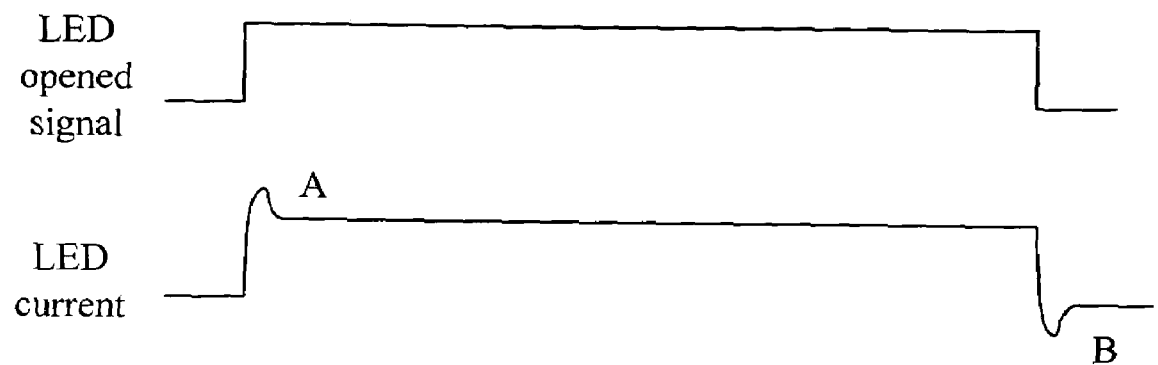
FIG. 3 shows an over-shooting and under-shooting phenomenon when a conventional optical mouse lights an LED.
Figure 4:
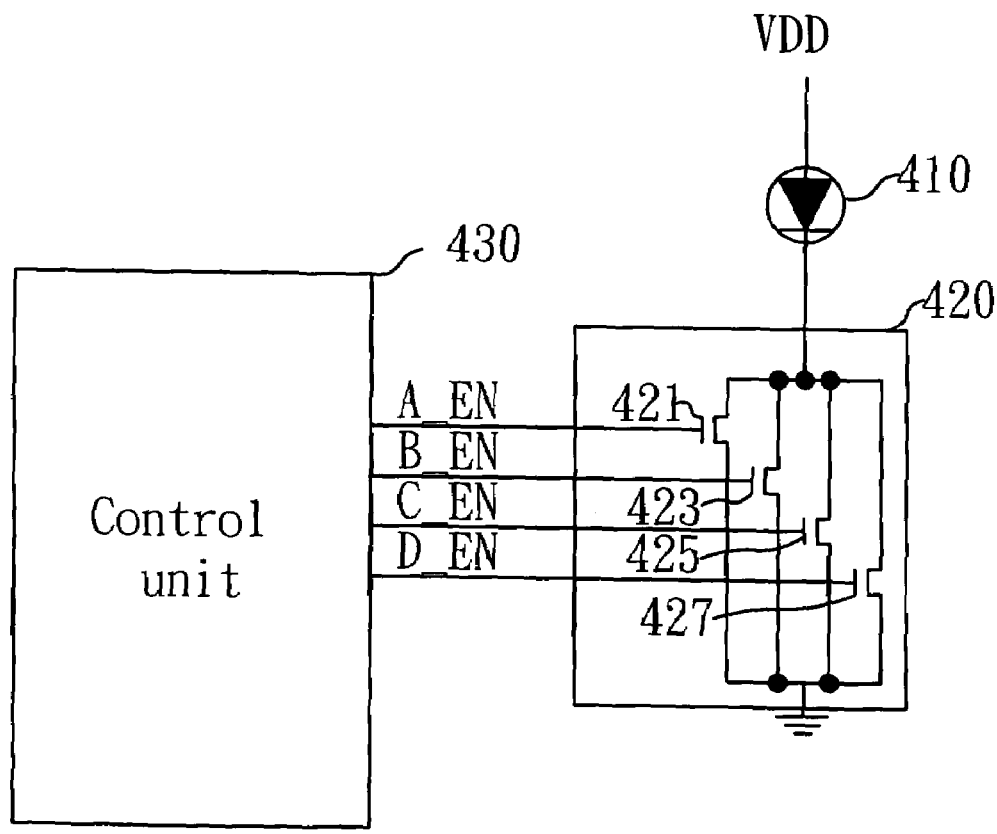
FIG. 4 is a block diagram of an embodiment of a light brightness controller for an optical mouse in accordance with the invention.

FIG. 4 is a block diagram of an embodiment of a light brightness controller for an optical mouse in accordance with the invention. In FIG. 4, the controller includes a light source 410, a current switch 420 and a control unit 430. The light source 410 is preferably an LED. The LED 410 illuminates a sampling plane of the optical mouse, and has a positive electrode connected to a high potential and a negative electrode connected to the current switch 420. The current switch 420 has a plurality of switches respectively connected to the light source 410 for providing the light source 410 with a current to flow therethrough as one of the switches is turned on. The control unit 430 is connected to the current switch 420 for controlling the current flowing through the light source 410 by controlling the switches on and off.

As shown, the switches consist of NMOSs 421, 423, 425 and 427. The NMOSs 421, 423, 425 and 427 respectively have a drain connected to the negative electrode of the LED 410, a source connected to a low potential GND and a gate connected to control signals A_EN, B_EN, C_EN and D_EN generated by the control unit 430. When the control signals A_EN, B_EN, C_EN and D_EN are high potential which can turn on their respective NMOSs, a current loop is formed by applying a current from the LED 410 to flow through the current switch, thereby lighting the LED.

Figure 5:
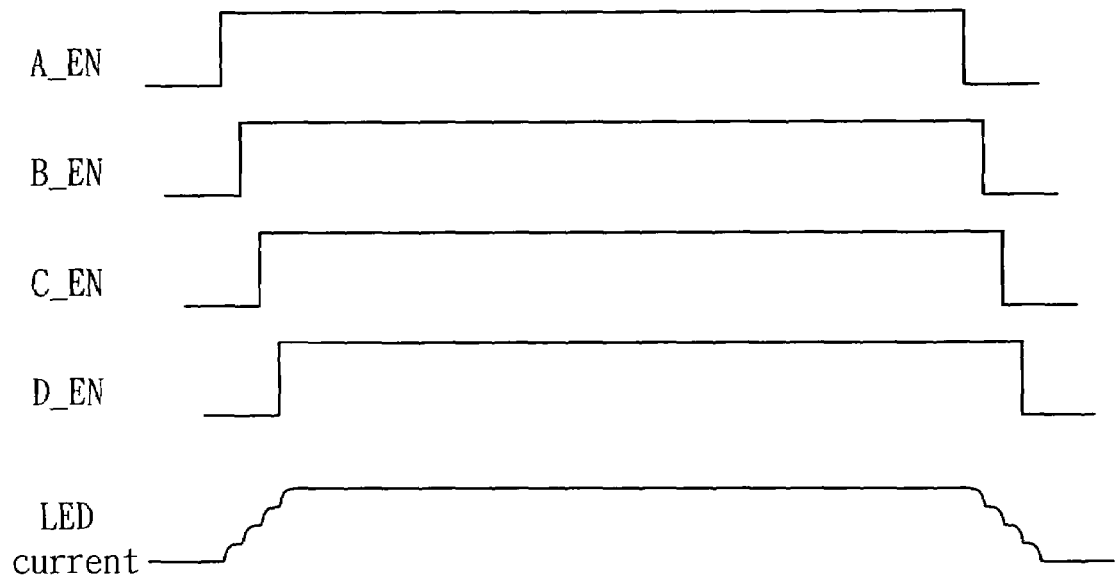
FIG. 5 is a control timing diagram of lighting an LED in accordance with the invention.

As shown in FIG. 5, the control unit 430 generates high control signals A_EN, B_EN, C_EN and D_EN sequentially to turn on NMOSs 421, 423, 425 and 427, so that the current following through the LED 410 can gradually increase, thereby avoiding the prior over-shooting and/or under-shooting from the LED 410 on and/or off and further reducing the mistakes caused by the optical mouse.

Figure 6:
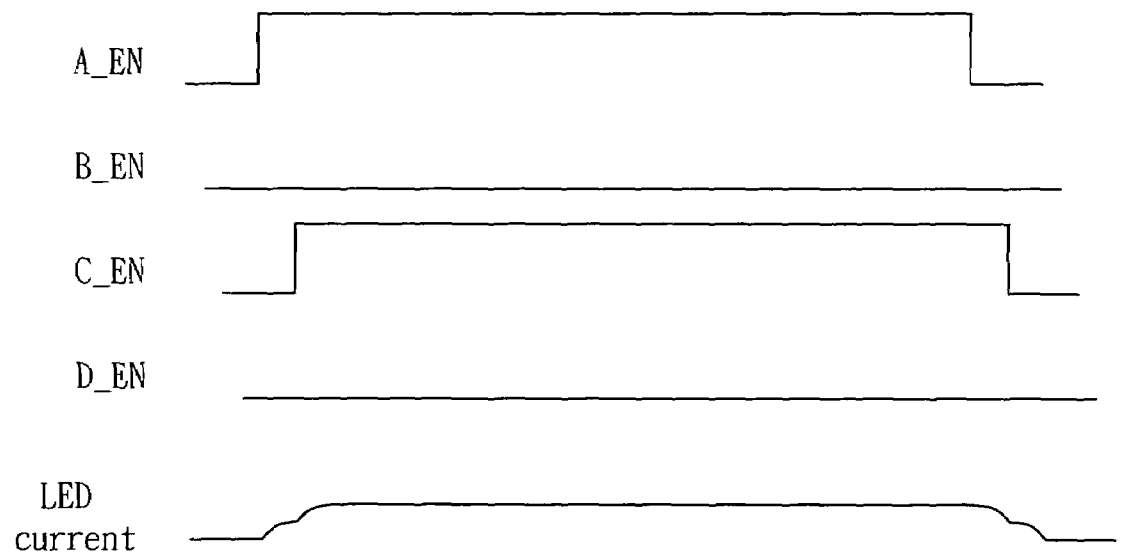
FIG. 6 is another control timing diagram of lighting an LED in accordance with the invention.

FIG. 6 is another control timing diagram of lighting an LED in accordance with the invention. As cited above, if an optical processor, i.e., the control unit 430, has high sensitivity to rays, the light source 410 is continuously lighting while the shutter is opened or even the optical mouse is active. Thus, it can be happened that the shutter cannot be shrunk but an image sensed by the optical processor 430 still presents in saturation, so that the optical mouse cannot be operated. To overcome this, as shown in FIG. 6, the control unit 430 generates the control signals A_EN and C_EN with high potential to turn on the NMOSs 421 and 425 while the NMOSs 423 and 427 are turned off. Thus, the current amplitude flowing through the LED 410 is only half to the original one, thereby avoiding images sensed by the optical processor 430 in saturation and reducing mistakes caused by the optical mouse.

Figure 7:
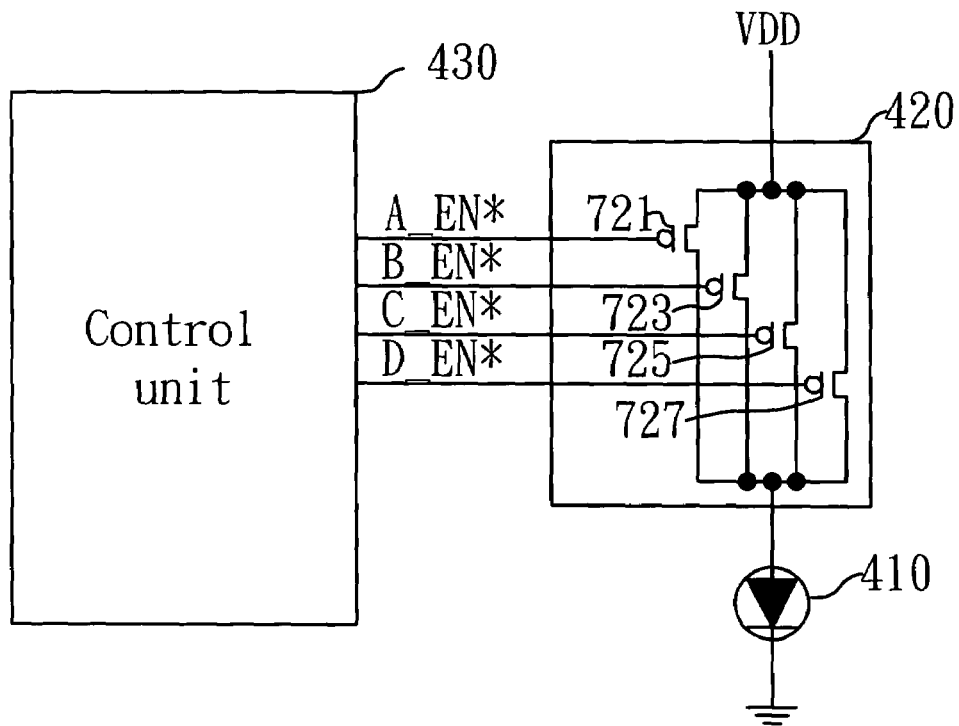
FIG. 7 is a block diagram of another embodiment in accordance with the invention.

FIG. 7 is a block diagram of another embodiment in accordance with the invention. As shown, the switches consist of PMOSs 721, 723, 725 and 727. The PMOSs 721, 723, 725 and 727 respectively have a drain connected to a positive electrode of the LED 410, a source connected to a high potential VDD and a gate connected to control signals A_EN*, B_EN*, C_EN* and D_EN* generated by the control unit 430. When the control signals A_EN*, B_EN*, C_EN* and D_EN* are low potential which can turn on their respective PMOSs, a current loop is formed by applying a current from the LED 410 to flow through the current switch, thereby lighting the LED.

Figure 8:
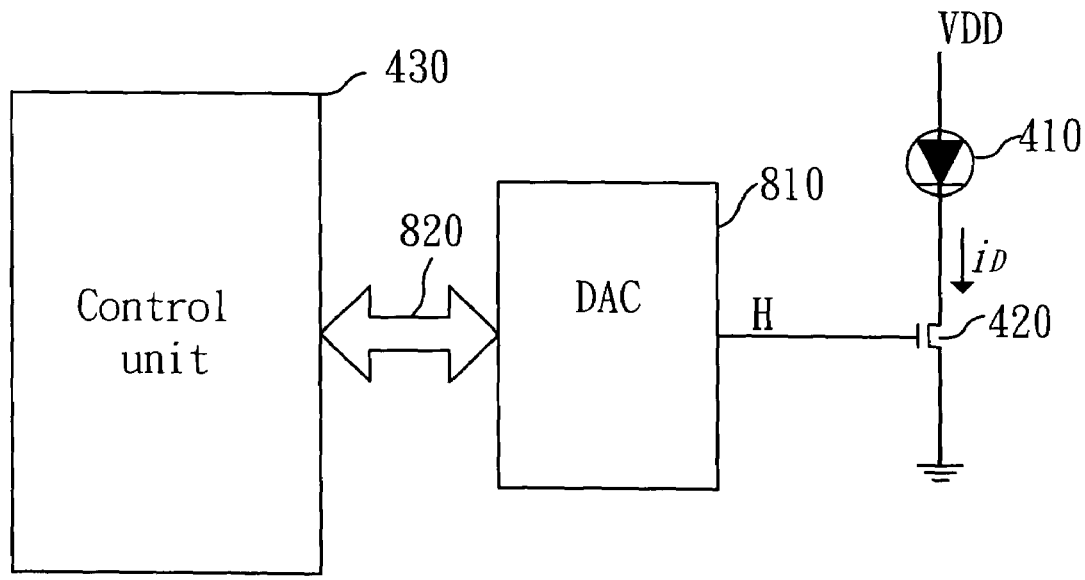
FIG. 8 is a block diagram of a further embodiment in accordance with the invention.

FIG. 8 is a block diagram of a further embodiment in accordance with the invention, which includes a light source 410, a current switch 420, a control unit 430 and a voltage-controlled device 810. The voltage-controlled device 810 has an output terminal H connected to the current switch 420 and can be a digital to analogue converter (DAC). The current switch 420 can be an NMOS. The current flowing through the NMOS 420 can be represented by the following equation:

$$i_D = \frac{\mu_n C_{ox}}{2} \frac{W}{L} (v_{GS} - V_T)^2 = \frac{\mu_n C_{ox}}{2} \frac{W}{L} (V_H - V_T)^2,$$

where $V_H$ indicates a voltage on the output terminal H. Namely, the control unit 430 sets the voltage on the output terminal H to the voltage-controlled device 810 through a bus 820, thereby controlling the current flowing through the NMOS 420 and further a brightness of the LED 410.

Figure 9:
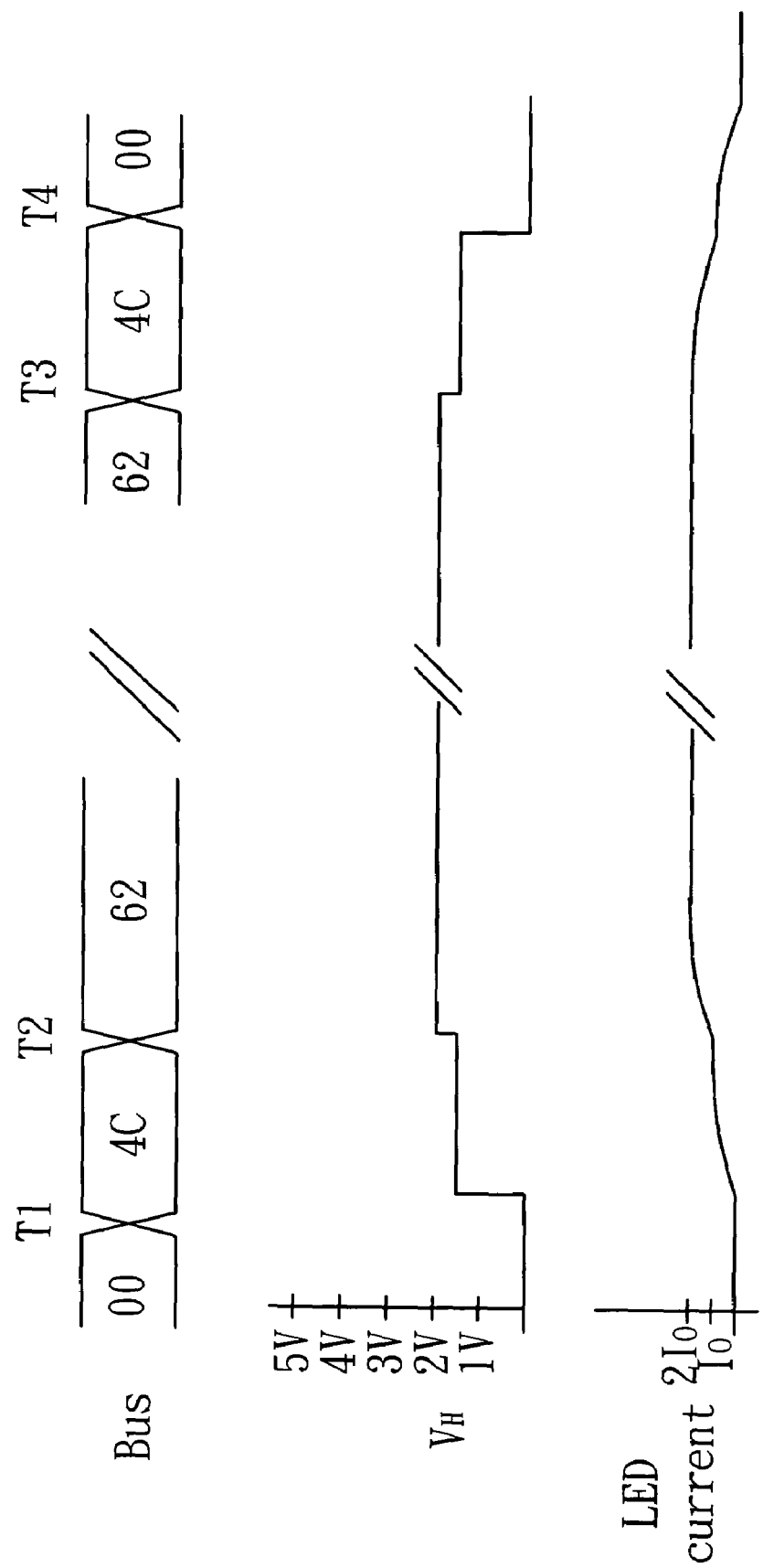
FIG. 9 is a further control timing diagram of lighting an LED in accordance with the invention.

FIG. 9 is a control timing diagram of FIG. 8, wherein $V_T$ is 0.5V. At T1, the control unit 430 writes a value of $4C_H$ to the DAC 810 through the bus 820, so as to obtain the voltage of the output terminal H of the DAC 810 as $V_H = (76/256)*5 \approx 1.5V$. In this case, the NMOS 420 is in saturation, and the current flowing through the NMOS 420 can be represented by the following equation:

$$i_D = \frac{\mu_n C_{ox}}{2} \frac{W}{L} (1.5 - 0.5)^2 = \frac{\mu_n C_{ox}}{2} \frac{W}{L} = Io,$$

wherein the NMOS 420 operating in saturation is equivalent to a variable resistor. At T2, the control unit 430 writes a value of $62_H$ to the DAC 810 through a bus 820, SO as to obtain the voltage of the output terminal H of the DAC 810 as $V_H = (98/256)*5 \approx 1.914V$. In this case, the current flowing through the NMOS 420 can be represented by the following equation:

$$i_D = \frac{\mu_n C_{ox}}{2} \frac{W}{L} (1.914 - 0.5)^2 = \frac{\mu_n C_{ox}}{2} \frac{W}{L} (1.414)^2 \approx 2Io.$$

Namely, as shown in FIG. 9, the DAC 810 sequentially generates different output voltages to accordingly control current flowing through the NMOS 420 and gradually increase current flowing through the LED 410, thereby avoiding over-shooting or under-shooting as turning the LED 410 on or off in the prior art and reducing mistakes caused by the optical mouse.

In view of the foregoing, it is known that the invention uses a plurality of MOSs to form the current switch 420 and a plurality of control signals generated by the control unit 430 to control the MOSs on and off and further current flowing through the LED 410, or uses a voltage generated by the voltage-controlled device 810 to control the current switch 420 to accordingly control current flowing through the LED 410. Therefore, the over-shooting or under-shooting in the prior art is avoided as turning the LED 410 on or off, and the images sensed by the optical processor 430 are still in saturation when the shutter cannot be shrunk anymore.

Although the present invention has been explained in relation to its preferred embodiment, it is to be understood that many other possible modifications and variations can be made without departing from the spirit and scope of the invention as hereinafter claimed.

What is claimed is:

1. A light brightness controller for an optical mouse, comprising:
 a light source, which illuminates a sampling plane of an optical mouse;
 a current switch, which has first to N-th switches respectively connected to the light source for providing the light source with a current to flow therethrough as one of the switches is turned on, wherein N is an integer larger than 2; and
 a control unit, which is connected to the current switch for controlling the current flowing through the light source by controlling the switches on and off
 wherein the control unit sequentially turns on the first to N-th switches one by one in order to gradually increase current flowing through the light.

2. The controller as claimed in claim 1, wherein the switches are N-type metal oxide semiconductor transistors.

3. The controller as claimed in claim 1, wherein the switches are P-type metal oxide semiconductor transistors.

4. The controller as claimed in claim 1, wherein the light source is a light emitted diode (LED).

5. A light brightness controller for an optical mouse, comprising:
 a light source, which illuminates a sampling plane of an optical mouse;
 a current switch, which has an N-type metal oxide semiconductor (NMOS) transistor connected to the light source such that a current flows through the light source when the switch is turned on, wherein the source of the NMOS is connected to ground and the drain of the NMOS is connected to the light source;
 a voltage-controlled device, which has an output terminal connected to the gate of the NMOS such that the current flowing through the light source is controlled by a voltage of the output terminal; and
 a control unit, which is connected to the voltage-controlled device in order to set sequentially increase the voltage, thereby gradually increasing the current flowing through the light source and a brightness of the light source.

6. The controller as claimed in claim 5, wherein the light source is an LED.

7. The controller as claimed in claim 5, wherein the voltage-controlled device is a digital to analogue converter (DAC).

8. The controller as claimed in claim 5, wherein the NMOS transistor is operated in saturation region.

9. The controller as claimed in claim 8, wherein the NMOS transistor operated in saturation region is equivalent to a variable resistor.

* * * * *